March 10, 1925.

E. W. WINANS

CAB FOR MOTOR VEHICLES

Filed Nov. 19, 1919

1,528,904

Inventor
Earl W. Winans,
Attorneys

Patented Mar. 10, 1925.

1,528,904

UNITED STATES PATENT OFFICE.

EARL W. WINANS, OF DETROIT, MICHIGAN, ASSIGNOR TO FEDERAL MOTOR TRUCK COMPANY, OF DETROIT, MICHIGAN, A CORPORATION OF MICHIGAN.

CAB FOR MOTOR VEHICLES.

Application filed November 19, 1919. Serial No. 339,099.

*To all whom it may concern:*

Be it known that I, EARL W. WINANS, a citizen of the United States of America, residing at Detroit, in the county of Wayne and State of Michigan, have invented certain new and useful Improvements in Cabs for Motor Vehicles, of which the following is a specification, reference being had therein to the accompanying drawings.

Drivers' cabs or similar enclosures for the drivers of motor vehicles, which cabs comprise a rigid frame carrying a rigid top or roof and mounted directly upon the chassis frame of the vehicle, are subjected to severe twisting strains due to the weaving or warping of the chassis frame under heavy loads and over rough ground. This twisting or weaving movement to which the cab frame is subjected, will in a very short time cause the roof of the cab to split or crack and open all the seams so that it will leak due to the rigid attachment of the roof to the frame whereby the roof is subjected to a twisting or weaving motion.

It is an object of this invention to overcome the above mentioned difficulty in vehicle cabs or bodies of this character and further, to provide a cab construction which is such that it may be readily removed from the vehicle for the purpose of shipping and which is also so constructed that a windshield of the usual type provided for motor vehicles may be installed. A further object is to provide a cab construction which is such as to give the driver an unobstructed vision in all directions and which embodies certain other new and useful features, all as hereinafter more fully described.

With the above and other ends in view the invention consists in the matters hereinafter set forth and more particularly pointed out in the appended claims, reference being had to the accompanying drawing, in which—

Figure 1:
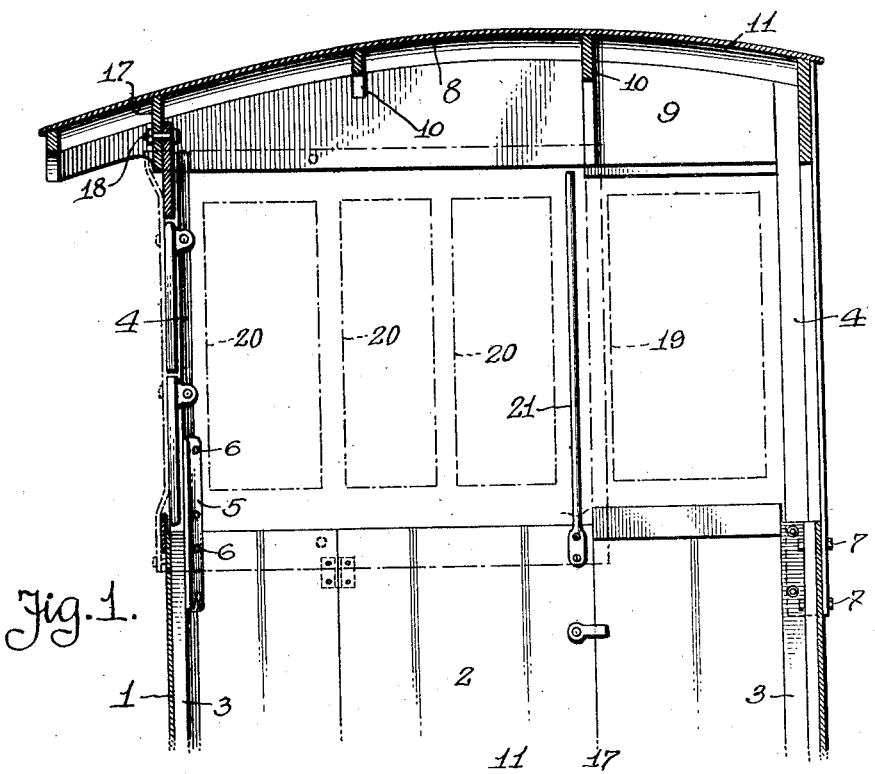
Figure 2:
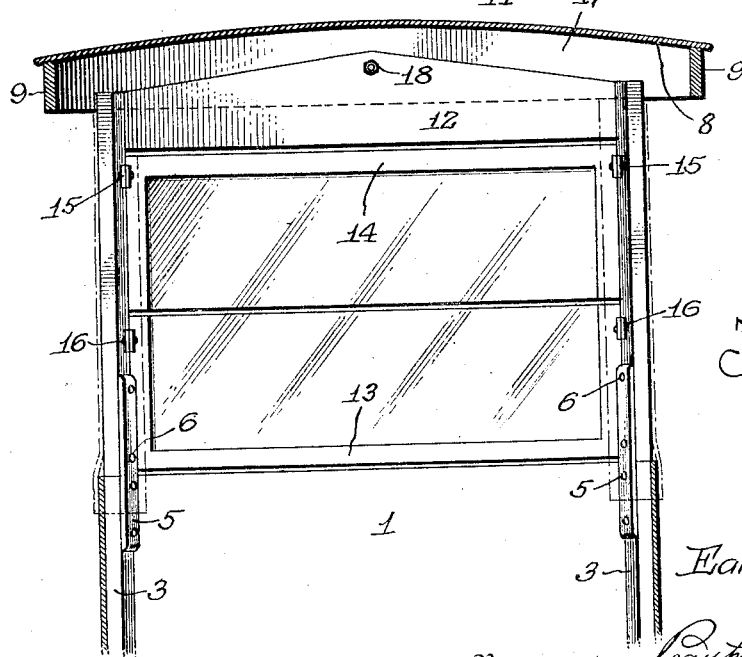

Figure 1 is a longitudinal vertical section through a vehicle cab illustrative of the invention, and Fig. 2 is a transverse vertical section through the same.

As shown in the drawing, the cab illustrated comprises the usual body 1 which is mounted directly upon the chassis frame (not shown) of the vehicle and has entrance doors 2 at each side thereof. Corner posts 3 or frame members lend rigidity to the body and, preferably, these posts extend only to the upper edge of the body but upward extensions 4 of these posts form the four corner posts of the cab, said posts 4 being detachably secured to the posts 3 in vertical alignment therewith by means of angle plates 5 secured by bolts 6 to the front corner posts and by means of bolts 7 which detachably secure the rear corner posts in position.

Mounted upon and rigidly secured to the rear corner posts 4 in any suitable manner, is a top or roof 8 the construction of which may be that of any of the usual forms, preferably comprising a frame of longitudinal side members 9 and transverse curved members 10 covered by a suitable sheathing or roof 11.

The upper ends of the front corner posts 4 are connected by a transverse bar 12, said posts and bar thus provide a rigid frame mounted upon the body 1 independent of the roof 8. As this frame is independent of the roof and mounted rigidly upon the body, it provides a suitable support or frame work for the usual wind-shield which comprises the two sashes 13 and 14 which may be independently attached to the frame by means of pivots 15 and 16 so that these sashes may be swung independently of each other, the same as the ordinary vehicle windshield to give proper ventilation to the cab.

The top or roof 8 is supported adjacent its forward end by providing a transverse member 17 which forms a rigid member of the roof and extends downwardly adjacent the transverse bar 12 of the windshield frame. The bar 12 and member 17 are pivotally connected by a pivot bolt 18 intermediate their ends, this bolt thus forming a single pivotal support for the roof at its forward end. The rear corner posts 4 of the cab form two rigid supports for the roof at its rear end and therefore the roof is supported at three points, upon one of which it has a free pivotal movement. Upon weaving and twisting of the chassis frame upon which the cab is rigidly mounted, this weaving movement is not transmitted to the roof because of the three point support of the roof which permits the front corner posts of the cab to move relatively to the rear corner posts without putting a torsional strain upon the roof which is free to turn relative to the front post by reason of the single point of pivotal support at the forward end of the roof.

In shipping motor vehicles, particularly large motor trucks upon which cabs are installed, it is found that these cabs usually prevent the compact storage or arrangement of the vehicle upon a railway car, and further, such cabs are liable to be broken or injured in transit due to the height to which they extend above the chassis of the vehicle and it is therefore of advantage to be able to quickly detach these cabs for shipment, in assembled condition so that they may be readily attached at their destination by unskilled workmen. To provide such ready detachment, the posts forming the four corners of the cab are detachably secured to the four corner posts of the body by means of the bolts 6 and 7 so that by removal of these bolts the cab as a unit may be lifted off and set upon the chassis of the vehicle rearwardly of the seat or in any other convenient position for shipment and it may be as readily set in place and attached when the vehicle has reached its destination.

By supporting the roof upon the two rear corner posts, and upon a frame comprising the two front corner posts and the cross member 12, the entire rear end and sides of the cab are open above the body 1 and the front end is closed by the usual wind shield carried by the frame, thus giving the driver a clear vision in all directions and providing a construction which is such as to lend itself to the ready application thereto of the usual detachable windows and curtains for closing the rear end and sides of the cab in stormy weather. Such windows are indicated in dotted lines in Fig. 1 at 19 and the usual construction of foldable curtains for closing the sides of the cab forwardly of these windows, are indicated in dotted lines at 20. The construction of the body and cab is such that the curtains 20 extending above the side doors of the body may be arranged to open and close with said doors by providing supporting rods 21 on the doors to engage the rear edges of the curtains.

By providing a three point support for rigid tops or roofs of vehicle cabs or the like, disintegration or cracking of such roofs is effectually prevented and by the construction and arrangement of the body and support thereon for the roof, the cab is made readily detachable, a clear vision in all directions is provided for the driver and by the construction of a front frame to which the top or roof is pivotally attached, a windshield of the usual construction provided for pleasure vehicles may be installed.

Obviously, changes in the construction and arrangement of the parts as shown in the drawing, may be made within the scope of the appended claims, without departing from the spirit of the invention and I do not therefore limit myself to the particular form or arrangement shown or the application thereof to the particular structure described.

Having thus fully described my invention, what I claim is:

1. In cabs for motor vehicles, and wherein the roof is of substantially unitary formation, means for removably supporting such roof upon a rigid cab body structure, said means including a supporting structure for the rear of the roof, and a supporting formation for the front of the roof, said supporting structure being permanently secured to the roof and removable with the roof when the latter is removed, and being positioned at spaced apart points laterally of the rear of the roof, said supporting formation including a portion carried permanently by the cab body and a portion permanently carried by the roof, said portions being pivotally connected at a single point in the width of the roof, with the pivot axis extending in a substantially horizontal direction.

2. A cab construction as in claim 1 characterized in that the point of pivotal connection of the supporting formation is located opposite a point midway of the spaced apart points of the supporting structure.

3. In a cab for motor vehicles, the combination of a body, a rigid top structure, supporting posts rigidly secured to the top structure for supporting the rear end thereof and detachably secured to the body, a rigid wind-shield frame detachably secured to the body and having a transverse member at its upper end, a transverse member on the top structure adjacent the transverse member of the frame, and means forming a single pivotal connection between said transverse members intermediate their ends.

In testimony whereof I affix my signature in the presence of two witnesses.

EARL W. WINANS.

Witnesses:
Lewis E. Flanders,
Anna M. Dorr.